(12) United States Patent
Miles et al.

(10) Patent No.: US 7,707,307 B2
(45) Date of Patent: Apr. 27, 2010

(54) METHOD AND APPARATUS FOR CONSTRUCTING A BACKUP ROUTE IN A DATA COMMUNICATIONS NETWORK

(75) Inventors: Kevin George Miles, Reading (GB); Ian Michael Charles Shand, Cobham (GB); Stewart Frederick Bryant, Redhill (GB); Stefano Benedetto Previdi, Wavre (BE); John Anthony Harper, Mountain View, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 930 days.

(21) Appl. No.: 10/340,371

(22) Filed: Jan. 9, 2003

(65) Prior Publication Data

US 2007/0038767 A1    Feb. 15, 2007

(51) Int. Cl.
*G06F 15/173* (2006.01)
*G01R 31/08* (2006.01)
(52) U.S. Cl. ............. 709/239; 709/242; 709/238; 709/241; 370/238; 370/229; 370/232; 370/235
(58) Field of Classification Search ............. 709/239, 709/242, 238, 241; 370/223, 256, 475, 252, 370/470, 238, 229, 232, 235
See application file for complete search history.

(56) References Cited

U.S. PATENT DOCUMENTS

| | | | |
|---|---|---|---|
| 4,827,411 A | 5/1989 | Arrowood et al. | |
| 4,956,835 A | 9/1990 | Grover et al. | |
| 4,987,536 A | 1/1991 | Humblet | |
| 5,128,926 A | 7/1992 | Perlman et al. | |
| 5,243,592 A | 9/1993 | Perlman et al. | |
| 5,253,248 A | 10/1993 | Dravida et al. | |
| 5,265,092 A | 11/1993 | Soloway et al. | |
| 5,455,865 A | 10/1995 | Perlman | |
| 5,627,822 A | 5/1997 | Edmaier et al. | |
| 5,652,751 A | 7/1997 | Sharony | |
| 5,754,543 A | 5/1998 | Seid | |
| 5,825,772 A | 10/1998 | Dobbins et al. | |

(Continued)

FOREIGN PATENT DOCUMENTS

CN    1440159 A    9/2003

(Continued)

OTHER PUBLICATIONS

Mikkel Thorup, "Fortifying OSPF/IS-IS against link-failure," Sep. 7, 2001, pp. 1-10.

(Continued)

*Primary Examiner*—Salad Abdullahi
(74) *Attorney, Agent, or Firm*—Hickman Palermo Truong & Becker LLP

(57) ABSTRACT

A method is disclosed for constructing a backup route from a source node around an adjacent component. The source node derives a first set of nodes reachable from it without traversing the adjacent component and a second set of nodes from which a neighbor node of adjacent components is reachable without traversing the adjacent component. The source node then constructs a backup route via an intermediate node in the intersection of the first and second sets.

36 Claims, 12 Drawing Sheets

U.S. PATENT DOCUMENTS

| | | | |
|---|---|---|---|
| 5,854,899 | A | 12/1998 | Callon et al. |
| 5,959,968 | A * | 9/1999 | Chin et al. ................. 370/216 |
| 5,999,286 | A | 12/1999 | Venkatesan |
| 6,002,674 | A | 12/1999 | Takei et al. |
| 6,018,576 | A | 1/2000 | Croslin |
| 6,032,194 | A * | 2/2000 | Gai et al. ..................... 709/239 |
| 6,044,075 | A | 3/2000 | Le Boudec et al. |
| 6,061,650 | A | 5/2000 | Malkin et al. |
| 6,084,864 | A | 7/2000 | Liron |
| 6,098,107 | A | 8/2000 | Narvaez-Guarnieri et al. |
| 6,111,257 | A * | 8/2000 | Shand et al. ................. 250/368 |
| 6,128,750 | A * | 10/2000 | Espy et al. ..................... 714/7 |
| 6,148,410 | A | 11/2000 | Baskey et al. |
| 6,185,598 | B1 | 2/2001 | Farber et al. |
| 6,243,754 | B1 | 6/2001 | Guerin et al. |
| 6,246,669 | B1 | 6/2001 | Chevalier et al. |
| 6,256,295 | B1 * | 7/2001 | Callon ........................ 370/254 |
| 6,260,072 | B1 | 7/2001 | Rodriguez-Moral |
| 6,278,687 | B1 | 8/2001 | Hunneyball |
| 6,295,275 | B1 * | 9/2001 | Croslin ....................... 370/216 |
| 6,321,271 | B1 * | 11/2001 | Kodialam et al. ........... 709/241 |
| 6,343,122 | B1 * | 1/2002 | Andersson .................. 379/219 |
| 6,347,078 | B1 | 2/2002 | Narvaez-Guarnieri et al. |
| 6,349,091 | B1 | 2/2002 | Li |
| 6,356,546 | B1 | 3/2002 | Beshai |
| 6,377,542 | B1 | 4/2002 | Asprey |
| 6,389,764 | B1 | 5/2002 | Stubler et al. |
| 6,415,427 | B2 | 7/2002 | Nitta et al. |
| 6,449,279 | B1 | 9/2002 | Beiser et al. |
| 6,473,421 | B1 | 10/2002 | Tappan |
| 6,507,577 | B1 | 1/2003 | Mauger et al. |
| 6,535,481 | B1 | 3/2003 | Andersson et al. |
| 6,578,084 | B1 | 6/2003 | Moberg et al. |
| 6,578,086 | B1 | 6/2003 | Regan et al. |
| 6,590,868 | B2 | 7/2003 | Shen |
| 6,636,498 | B1 | 10/2003 | Leung |
| 6,668,282 | B1 | 12/2003 | Booth et al. |
| 6,690,671 | B1 | 2/2004 | Anbiah et al. |
| 6,697,325 | B1 | 2/2004 | Cain |
| 6,697,333 | B1 | 2/2004 | Bawa et al. |
| 6,704,320 | B1 | 3/2004 | Narvaez et al. |
| 6,711,125 | B1 * | 3/2004 | Walrand et al. ............. 370/223 |
| 6,714,551 | B1 * | 3/2004 | Le-Ngoc ..................... 370/401 |
| 6,718,382 | B1 | 4/2004 | Li et al. |
| 6,744,727 | B2 | 6/2004 | Liu et al. |
| 6,765,896 | B1 | 7/2004 | Ahmed et al. |
| 6,778,531 | B1 | 8/2004 | Kodialam et al. |
| 6,829,215 | B2 | 12/2004 | Tornar |
| 6,882,627 | B2 | 4/2005 | Pieda et al. |
| 6,895,441 | B1 | 5/2005 | Shabtay et al. |
| 6,922,765 | B2 | 7/2005 | Jacobs |
| 6,928,484 | B1 | 8/2005 | Huai et al. |
| 6,944,131 | B2 | 9/2005 | Beshai et al. |
| 6,973,057 | B1 | 12/2005 | Forslow |
| 6,982,951 | B2 | 1/2006 | Doverspike et al. |
| 6,990,068 | B1 | 1/2006 | Saleh et al. |
| 6,993,593 | B2 | 1/2006 | Iwata |
| 6,996,065 | B2 | 2/2006 | Kodialam et al. |
| 7,016,313 | B1 | 3/2006 | Harper |
| 7,058,016 | B1 | 6/2006 | Harper |
| 7,065,059 | B1 | 6/2006 | Zinln |
| 7,093,097 | B2 | 8/2006 | Herr et al. |
| 7,099,286 | B1 | 8/2006 | Swallow |
| 7,113,481 | B2 | 9/2006 | Elie-Dit-Cosaque et al. |
| 7,158,486 | B2 * | 1/2007 | Rhodes ....................... 370/256 |
| 7,177,295 | B1 | 2/2007 | Sholander et al. |
| 7,209,434 | B2 | 4/2007 | Kano et al. |
| 7,242,664 | B2 * | 7/2007 | Einstein et al. ............. 370/216 |
| 7,248,579 | B1 | 7/2007 | Friedman |
| 7,260,645 | B2 * | 8/2007 | Bays ........................... 709/238 |
| 7,274,654 | B2 * | 9/2007 | Yang et al. .................. 370/217 |
| 7,274,658 | B2 * | 9/2007 | Bornstein et al. ........... 370/227 |
| 7,349,427 | B1 | 3/2008 | Canning et al. |
| 7,490,165 | B1 * | 2/2009 | Katukam et al. ............ 709/239 |
| 7,500,013 | B2 | 3/2009 | Dziong et al. |
| 2002/0004843 | A1 * | 1/2002 | Andersson et al. .......... 709/238 |
| 2002/0012318 | A1 | 1/2002 | Moriya et al. |
| 2002/0021671 | A1 | 2/2002 | Quinlan |
| 2002/0037010 | A1 | 3/2002 | Yamauchi |
| 2002/0069292 | A1 | 6/2002 | Gaddis et al. |
| 2002/0093954 | A1 * | 7/2002 | Weil et al. ................... 370/389 |
| 2002/0112072 | A1 * | 8/2002 | Jain ............................ 709/239 |
| 2002/0116669 | A1 | 8/2002 | Jain |
| 2002/0131362 | A1 | 9/2002 | Callon |
| 2002/0136223 | A1 | 9/2002 | Ho |
| 2002/0147800 | A1 | 10/2002 | Gai et al. |
| 2002/0171886 | A1 | 11/2002 | Wu et al. |
| 2002/0172157 | A1 | 11/2002 | Rhodes |
| 2002/0191545 | A1 | 12/2002 | Pieda et al. |
| 2003/0053414 | A1 | 3/2003 | Akahane et al. |
| 2003/0063613 | A1 * | 4/2003 | Carpini et al. .............. 370/401 |
| 2003/0079040 | A1 | 4/2003 | Jain et al. |
| 2003/0103449 | A1 | 6/2003 | Barsheshet et al. |
| 2003/0147352 | A1 | 8/2003 | Ishibashi et al. |
| 2003/0193958 | A1 | 10/2003 | Narayanan |
| 2003/0193959 | A1 * | 10/2003 | Lui et al. ..................... 370/401 |
| 2003/0202473 | A1 | 10/2003 | Patrick et al. |
| 2003/0210705 | A1 | 11/2003 | Seddigh et al. |
| 2004/0001497 | A1 | 1/2004 | Sharma |
| 2004/0001508 | A1 | 1/2004 | Zheng et al. |
| 2004/0004955 | A1 | 1/2004 | Lewis |
| 2004/0071089 | A1 | 4/2004 | Bauer et al. |
| 2004/0085894 | A1 | 5/2004 | Wang et al. |
| 2004/0088389 | A1 | 5/2004 | Shah |
| 2004/0107287 | A1 | 6/2004 | Ananda et al. |
| 2004/0117251 | A1 | 6/2004 | Shand |
| 2004/0151181 | A1 | 8/2004 | Chu et al. |
| 2004/0185777 | A1 | 9/2004 | Bryson |
| 2004/0190454 | A1 | 9/2004 | Higasiyama |
| 2004/0223497 | A1 | 11/2004 | Sanderson et al. |
| 2005/0007950 | A1 * | 1/2005 | Liu ............................. 370/221 |
| 2005/0031339 | A1 | 2/2005 | Qiao et al. |
| 2005/0038909 | A1 | 2/2005 | Yoshiba et al. |
| 2005/0050220 | A1 | 3/2005 | Rouyer et al. |
| 2005/0071709 | A1 | 3/2005 | Rosenstock et al. |
| 2005/0088965 | A1 | 4/2005 | Atlas et al. |
| 2005/0097219 | A1 | 5/2005 | Goguen et al. |
| 2005/0111351 | A1 | 5/2005 | Shen |
| 2005/0152289 | A1 | 7/2005 | Nagata et al. |
| 2005/0201273 | A1 | 9/2005 | Shimizu |
| 2005/0201371 | A1 | 9/2005 | Lauer |
| 2005/0226400 | A1 | 10/2005 | Farber et al. |
| 2006/0007929 | A1 | 1/2006 | Desai et al. |
| 2006/0018253 | A1 | 1/2006 | Windisch et al. |
| 2006/0031482 | A1 | 2/2006 | Mohan et al. |
| 2006/0050630 | A1 | 3/2006 | Kobayashi et al. |
| 2006/0080421 | A1 | 4/2006 | Hu |
| 2006/0092941 | A1 | 5/2006 | Kusama |
| 2006/0182117 | A1 | 8/2006 | Chen et al. |
| 2006/0221962 | A1 | 10/2006 | Previdi et al. |
| 2006/0291446 | A1 | 12/2006 | Caldwell et al. |
| 2007/0011284 | A1 | 1/2007 | le Roux et al. |
| 2007/0011351 | A1 | 1/2007 | Bruno et al. |
| 2007/0038767 | A1 | 2/2007 | Miles et al. |
| 2007/0038891 | A1 | 2/2007 | Graham |
| 2007/0124453 | A1 | 5/2007 | Slaughter et al. |

FOREIGN PATENT DOCUMENTS

WO     WO 02/06918     1/2002

OTHER PUBLICATIONS

International Searching Authority, International Search Report, PCT/US04/33827, dated Mar. 28, 2005, 8 pages.

Current Claims, PCT/US04/33827, 6 pages.
Notification of Transmittal of the International Search Report and the Written Opinion of the International Searching Authority, or the Declaration as received in corresponding International application No. PCT/US06/06238.
Pending claims in PCT/US06/06238.
Cisco, "MPLS Traffic Engineering Fast Reroute—Link Protection", Release No. 12.0 (16)ST, retrieved from internet from website: http://www.cisco.com/univercd/cc/td/doc/product/software/ios120/120newft/120limit/120st/120st16/frr.pdf , 2002, 24 pages.
Vutukury, Srinivas, "Multi-Path Routing Mechanisms for Traffic Engineering and Quality of Service in the Internet", thesis of Srinivas Vutukury, Mar. 2001, 152 pages.
Kini, Sriganesh, et al., "Traffic Restoration in Links State Protocols using Neighbor's Shortest Path", Internet Draft, Mahi Networks, retrieved from internet: < http://www.potaroo.net/ietf/old-ids/draft-kini-traf-restore-nsp-00.txt >, May 2002, 6 pages.
U.S. Appl. No. 10/323,358, filed Jun. 17, 2004, Michael Shand, entitled "Method and apparatus for advertising a link cost in a data communications network", 29 pages.
Cisco Systems, Inc., "Tunnel ToS," Cisco IOS Release 12.0(17)S, 12.0(17)ST, 12.2(8)T, and 12.2(14)S, Jan. 28, 2003, pp. 1-15. cited by other .
Cisco Systems, Inc., "AppleTalk, IP, and Novell IPX Overview," Sep. 9, 2002, pp. IV-1-IV-6. cited by other .
Cisco Systems, Inc., "Why Are OSPF Neighbors Stuck in Exstart/Exchange State?,"1992-2003, 8 pages. cited by other .
Cisco Systems, Inc., "Trace," Chapter 32, Sep. 13, 2002, pp. 32-1-32-12. cited by other.
ISO/IEC 10589: "Information technology—Telecommunications and information exchange between systems—Intermediate System to Intermediate System intra-domain routeing information exchange protocol for use in conjunction with the protocol for providing the connectionless-mode network service", (ISO 8473), Second edition, Nov. 15, 2002, 208 pgs.
Karn, Phil et al., "Improving Round-Trip Time Estimates in Reliable Transport Protocols", Computer Communication Review (pp. 67-74).
"Open System Interconnection Routing Protocol", Chapter 45, Internetworking Technologies Handbook (pp. 45-1 through 45-8).
"Open Shortest Path First", Chapter 46, Internetworking Technologies Handbook (pp. 46-1 through 46-6).
U.S. Appl. No. 10/442,589, filed May 20, 2003, Stewart Frederick Bryant, et al., entitled "A Method and Apparatus for Constructing a Transition Route in a Data Communication Network," 45 pages.
Doyle, J., CCIE Professional Development: Routing TCP/IP vol. 1, p. 501-507, Cisco Press 1998.
Dijkstra, E.W., "A note on two problems in connexion with graphs," Numerische Mathematik, 1 (1959), S. 269-271.
Fortz, Bernard, et al., "Optimizing OSPF/IS-IS Weights in a Changing World," IEEE JSAC Special Issue on Advances in Fundamentals of Network Management, Spring 2002, pp. 1-31.
Thorup, Mikkel, et al., "Avoiding Ties in Shortest Path First Routing," AT&T Labs-Research, Shannon Laboratory, Florham Park, NJ, pp. 1-13.
Thorup, Mikkel, "OSPF Areas Considered Harmful," AT&T Labs-Research, Florham Park, NJ, Apr. 22, 2003, pp. 1-9.
Office Action from China for foreign patent application 200480033399.8 dated Feb. 29, 2008 (4 pgs) with English Translation (4 pgs).
Current Claims in China patent application 200480033399.8 (3 pgs) with marked up copy (4 pgs).
M. Watari, "Masafumi Watari's Web Site," "Papers" page, printed May 7, 2003, http://www.sfc.wide.ad.jp/~watari/papers.html, 1 page.
C. Perkins, "IP Mobility Support for IPv4," Jan. 2002, IETF Network Working Group Request for Comments 3220 (RFC 322), from www.ietf.org, pp. 1-98.
S. Deering, et al., "Internet Protocol, Version 6 (IPv6), Specification," Dec. 1998, IETF Network Working Group Request for Comments 2460, from www.ietf.org, pp. 1-39.

University of Southern California, Information Sciences Institute, "Internet Protocol, Darpa Internet Program, Protocol Specification," Sep. 1981 (IETF RFC 791), 48 pages.
D. Johnson, et al., "Mobility Support in Ipv6, draft-ietf-mobileip-ipv6-21.txt," Feb. 26, 2003, http://www.ietf.org/html.charters/mobileip-charter.html, pp. 1-169.
Ryuji Wakikawa, et al., "Mobility Related Research at the InternetCAR Project," http://www.connectathon.org/talks03/cthon-keio.pdf, Mar. 5, 2003, 12 pages.
William Stallings, "Mobile IP," http://www.cisco.com/warp/public/ipi 4-2_ip.html, 11 pages.
Cisco Systems, Inc., "White Paper, *Cisco Mobile IP*, Executive Summary," 2002, http://www.cisco.com/warp/public/cc/pd/10sw/prodlit/mbxul_wp.htm, 8 pages.
Cisco Systems, Inc., "Configuring Mobile IP," http://www.cisco.com/warp/public/732/Tech/mobile/IP/techdocument, 2003, 38 pages.
Fei Dai et al., "On Independently Finding Converging Paths in Internet," 2001, pp. 1-13.
Paolo Narváez et al., "Local Restoration Algorithm for Link-State Routing Protocols," 1998, 6 pages.
Jie Wu et al., "An Extended Fault-Tolerant Link-State Routing Protocol in the Internet," 2001, 7 pages.
Paolo Narváez et al., "Fault-Tolerant Routing in the Internet without Flooding," 1998, pp. 1-13.
Takuya Yoshihiro, "Design and Analysis of Routing Algorithms toward the Next Generation Internet," Dec. 2002, 91 pages.
M. Leelanivas, et al., "Graceful Restart Mechanism for Label Distribution Protocol," Feb. 2003, Network Working Group, Request for Comments: 3478, http://rfc3478.x42.com, data retrieved Apr. 28, 2004, pp. 1-11.
R. Balay, et al., "IS-IS Mesh Groups," Oct. 2000, Network Working Group, Request for Comments: 2973, pp. 1-8.
M. Shand, et al., Restart signaling for IS-IS, draft-ietf-isis-restart-05.txt, Jan. 2004, Network Working Group, Internet Draft, http://www.ietf.org/internet-drafts/draft-ietf-isis-restart-05.txt, data retrieved Apr. 28, 2004, pp. 1-20.
Amir Hermelin, et al., "Extending the Number of IS-IS LSP Fragments Beyond the 256 Limit, draft-ietf-isis-Isp-frags-02.txt," Network Working Group, Internet Draft, http://www.ietf.org/internet-drafts/draft-ietf-isis-ext-Isp-frags-02.txt, data retrieved Apr. 28, 2004, pp. 1-12.
M. Shand, et al., "Restart signaling for IS-IS, draft-ietf-isis-restart-04.txt," Jul. 2003, Network Working Group, Internet Draft, http://vesuvio.ipv6.tilab.com/internet-drafts/draft-ietf-isis-restart-04.txt. data retrieved Apr. 28, 2004, pp. 1-18.
http://en.wikipedia.org/wiki/IP_protocol, Oct. 28 2006.
Wikipedia, "Ping," located in the internet at <http://wikipedia.org/wiki/Ping>, retrieved on Feb. 1, 2007, 3 pages.
Wikipedia, "List of IPv4 Protocol Numbers," located on the internet at http://en.wikipedia.org/wiki/IP_protocol, retrieved on Feb. 1, 2007, 7 pages.
Rubini et al., "Linux Device Driver", $2^{nd}$ Edition, Jun. 2001, Chapter 2 and 13, 95 pages.
European Patent Office, "Supplementary European Search Report", application No. EP 06720965, dated Jul. 21, 2009, 6 pages.
Claims, application No. EP 06720965, 4 pages.
Wang, Zheng et al., "Shortest Path First with Emergency Exits," ACM 089791-405-8/90/0009/0166, 1990, pp. 166-176.
International Searching Authority, "Notification of Transmittal of the International Search Report and the Written Opinion of the International Searching Authority, or the Declaration", international application No. pct/us06/28083, Received Nov. 30, 2007, 11 pages.
Claims, international application No. pct/us06/28083, 3 pages.
Backes, "Spanning Tree Bridges—Transparent Bridges for Interconnection of IEEE 802 LANs", 1988, IEEE, 5 pages.
European Patent Office, "Supplementary European Search Report", application No. EP 04795045, May 27, 2009, 4 pages.
Claims, application No. EP 04795045, 4 pages.
Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.

State Intellectual Property Office of the People's Republic of China, "The First Office Action", filing No. 200680001652.0, May 8, 2009, 15 pages.

Claims, filing No. 200680001652.0, 4 pages.

Office Action from EPO for foreign patent application No. 04 800 942.7-1525 dated Apr. 27, 2009, (6 pgs).

AU Examiner's First Report for foreign patent application No. 2004311004 dated Jun. 23, 2008 (1 pg).

AU Examiner's Second Report for foreign patent application No. 2004311004 dated Aug. 18, 2008 (1 pg).

Current claims for AU foreign patent application No. 2004311004 (6 pgs).

Office Action from CN for foreign application No. 200480033007.8 dated Apr. 11, 2008 (10 pgs) with English translation (11 pgs).

Current claims for CN foreign patent application No. 200480033007.8 (6 pgs).

U.S. Appl. No. 10/719,003, filed Nov. 21, 2003, Office Action Mailing Date May 9, 2007.

European Patent Office, "Communication pursuant to Article 94(3) EPC", Application No. 04795045.6-2416, dated Sep. 7, 2009, 5 pages.

Current Claims, Application No. 04795045.6-2416, 5 pages.

Karn Phil et al., Improving Round-Trip Time Estimates in Reliable Transport Protocols, 1987, ACM workshop on Frontiers in computer communication technology, pp. 2-7.

Open System Interconnection Routing Protocol, Jun. 1999, Chapter 41, Internetworking Technologies handbook (all pages of chapter 41).

Open Shortest Path First, Jun. 1999, Chapter 42, Internetworking Technologies handbook (all pages of chapter 42).

\* cited by examiner

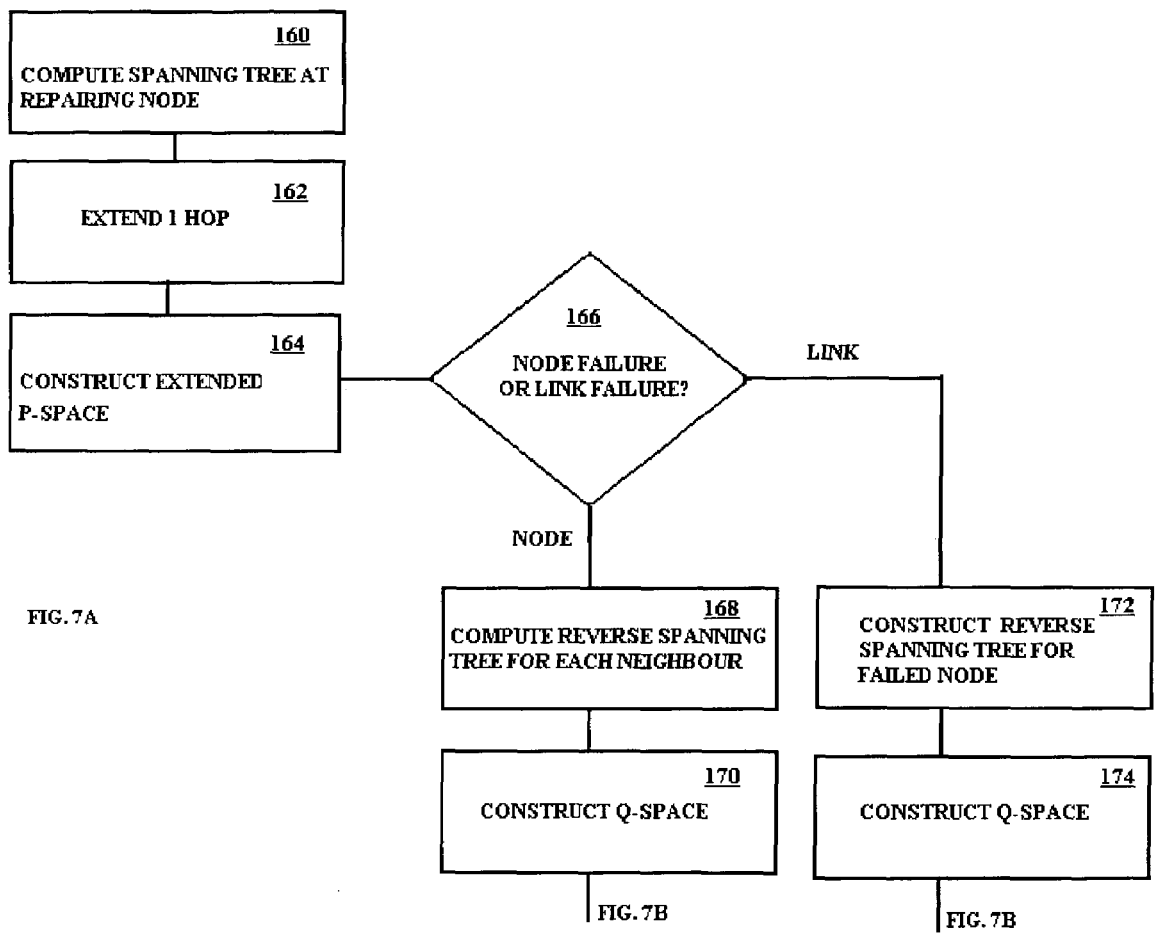

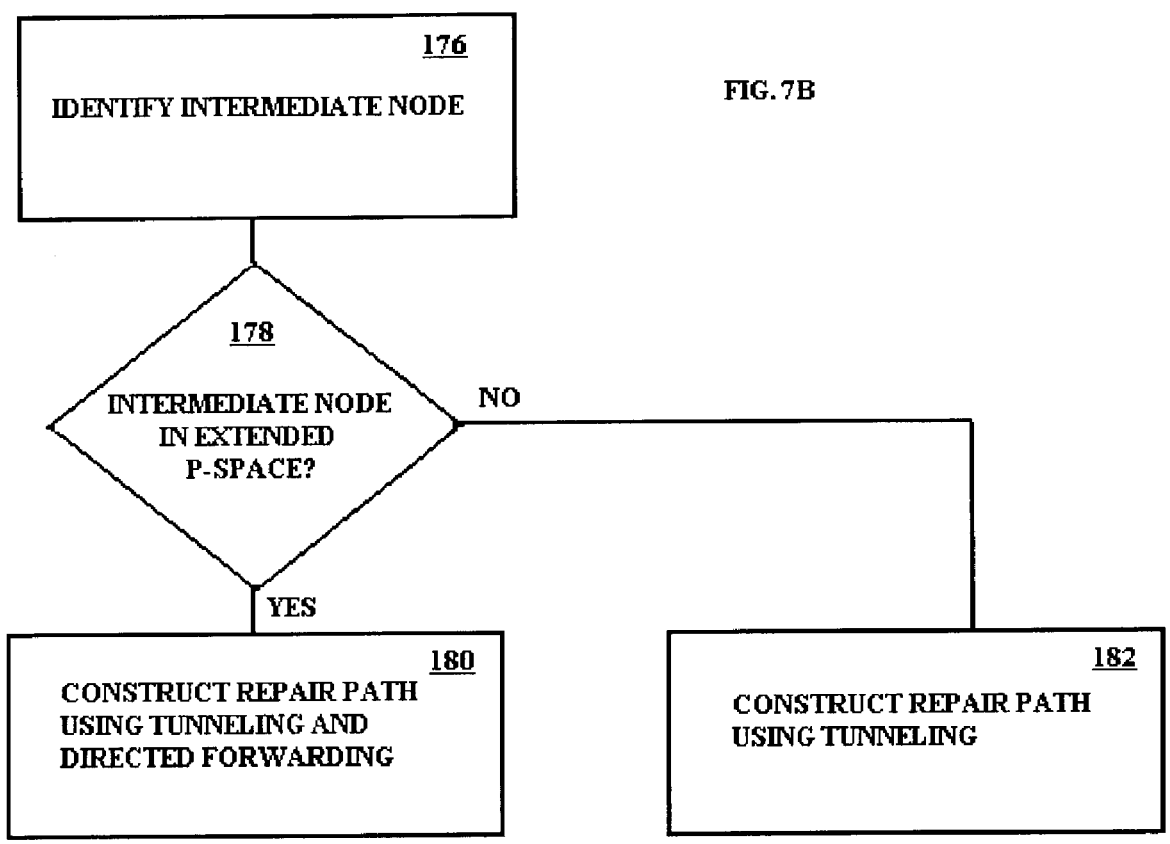

US 7,707,307 B2

METHOD AND APPARATUS FOR CONSTRUCTING A BACKUP ROUTE IN A DATA COMMUNICATIONS NETWORK

FIELD OF THE INVENTION

The present invention generally relates to routing of data in a network. The invention relates more specifically to a method and apparatus for constructing a backup route in a data communication network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (usually routers directing the packet along one or more of a plurality of links connected to it) according to one of various routing protocols.

De-activation of a network component, i.e. a link or a node, either by component failure or by planned downtime needs to be managed in order to avoid the risk of packet loss. In known systems, such de-activations cause routing transitions to take place, during which, distributed routing algorithms may open up an alternative route. However such transitions can be slow, of the order of seconds before convergence and in the interim data can be lost. Although packet loss is commonly dealt with by higher level protocols that re-send packets, the inherent delays can adversely affect time critical functions such as voice and pseudo-wire traffic.

Various solutions have been proposed for providing backup routes.

For example in Multi-Protocol Label Switching (MPLS) fast re-route, pre-configured backup paths are provided for destinations, as described in the document entitled "MPLS Traffic Engineering Fast Reroute—Link Protection" available at the time of this writing in the file 'frr.pdf' in directory "univercd/cc/td/doc/product/software/ios120/120newft/120limit/120st/120st16" of the domain "cisco.com" on the World Wide Web. However MPLS backup paths rely on source routing.

Various other proposals based on link state routing rely on "downstream paths" according to which a node determines whether an alternative path to a destination node is available which will not simply loop a packet back to it (i.e. the packets will travel "downstream"). Examples of such proposals are the Internet Draft of Kini, Yang, dated May 2002 entitled "Traffic Restoration in Links State Protocols using Neighbor's Shortest Path" available at the time of this writing in the file 'draft-kini-traf-restore-nsp-00.txt' in directory "internet-drafts" of the domain "ietf.org" on the World Wide Web. A further example is Srinivas Vutukury, "Multi-Path Routing Mechanisms for Traffic Engineering and Quality of Service in the Internet"PhD Thesis, computer Science, University of California, Santa Cruz, March 2001. However such solutions will not work if no downstream path is available.

Zhang Yang and Jon Crowcroft in the paper "Shortest Path First with Emergency Exits" ACM SIGCOMM Computer Communication Review Volume 209, Issue 4 (September 1990) propose a solution according to which, for a given destination node an alternative path (AP) is created to the shortest path (SP) for a specified node to the destination using a downstream path (i.e. a path which will get a packet closer to its destination than the current node) identified by calculating whether any of the specified node's neighbor nodes can reach the destination without looping back to the specified node. If, for any destination in the network, an AP is not available, then the specified node sends a message to each of its neighbors to assess whether any of their neighbors can provide a downstream path to the destination. If not then the message is propagated out once again until an "exit" to the destination node is identified, providing a "reverse alternative path" (RAP). The specified node maintains a table, for every destination, of the SP and AP and, where an AP is not available an RAP.

Various problems arise with this approach. First of all because it relies on a signaling protocol in order to establish whether an RAP is available, the process is time-and bandwidth-consuming. Furthermore in order to forward a packet to an exit in an RAP the source has to force it upstream, potentially over a number of hops which requires source routing. As a result an additional protocol is overlaid on the link state protocol and the processing burden of the specified node is also increased.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 7A and 7B are flow diagrams illustrating in more detail a method for constructing a backup route;

DETAILED DESCRIPTION OF THE PREFERRED EMBODIMENT

A method and apparatus for constructing a backup route is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Constructing a Backup Route
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method of constructing a backup route in a data communications network having as components nodes and links. The backup route is calculated from a repairing node storing a network topology around an adjacent component which can be, for example, an adjacent link or an adjacent node joined by an adjacent link. In one embodiment, there is derived from the stored topology a first set of nodes reachable from the repairing node without traversing the adjacent component. There is then derived a second set of nodes from which a neighbor node of the adjacent component is reachable without traversing the adjacent component. A backup route is then constructed around the adjacent component via an intermediate node. The intermediate node is in the intersection of the first and second sets.

As a result the method allows a backup route to be constructed such that, as long as the packet reaches the intermediate node, it will progress towards its destination using normal forwarding and without traversing the component that has failed or otherwise been deactivated. Furthermore there is no need to send queries to other nodes in order to determine the route as the first and second sets of nodes are derived at the first node.

In other aspects, the invention encompasses a computer apparatus and a computer-readable medium configured to carry out the foregoing steps.

2.0 Structural and Functional Overview

Figure 1A:
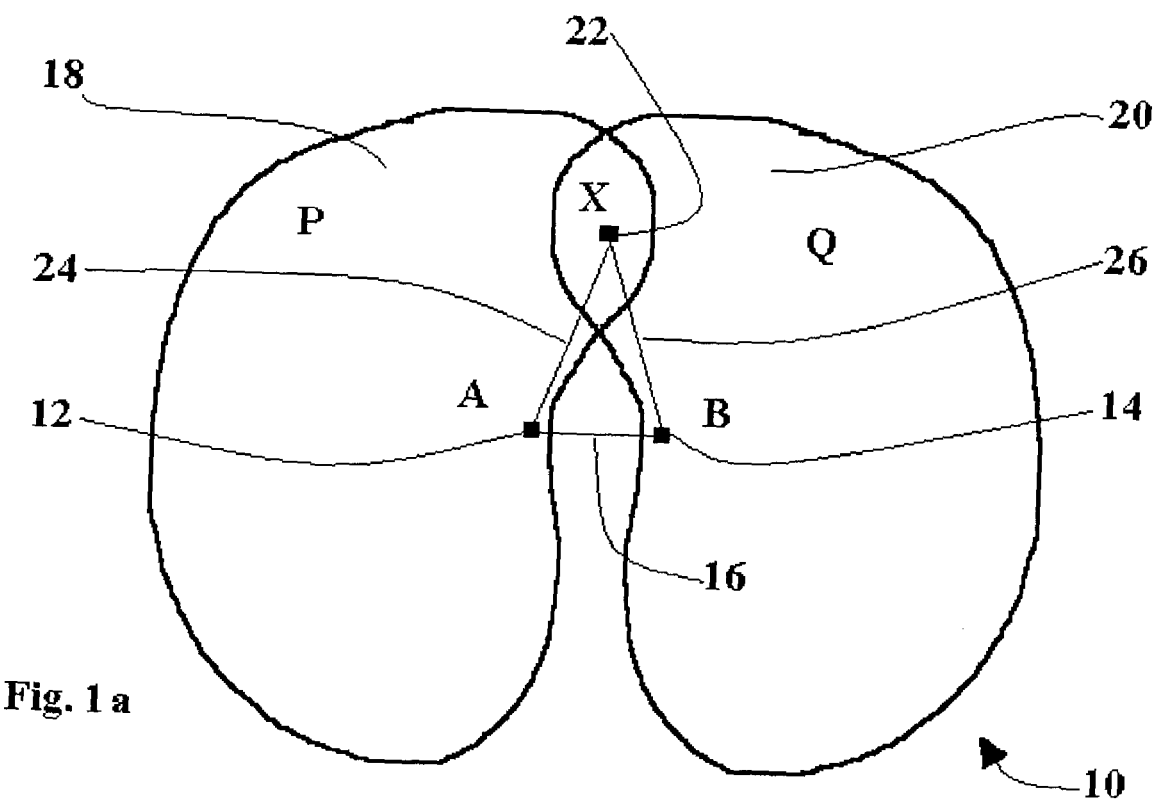
FIG. 1a is a representation of a network that illustrates an overview of a method for constructing a backup route.

The method can be further understood with reference to the embodiment shown in FIG. 1a which depicts an illustrative network showing an approach to constructing a backup route. The network comprises a data communication network of nodes and links, which can be the Internet or a sub-network such as a routing domain or a virtual network which is designated generally 10 and includes as repairing node, node A, reference numeral 12, as an adjacent component, link 16 and, as neighboring target node to the adjacent component, node B, reference numeral 14.

Node A computes a first set of nodes comprising the set (which can be termed the "P-space 18") of all nodes reachable according to its routing protocol from node A, other than nodes reachable by traversing the link 16. Node A then computes a second set of nodes comprising the set of all nodes from which node B is reachable without traversing the link 16 represented by space 20 (the "Q-space"). In one embodiment the P-space and Q-space are pre-computed. The method then determines whether any intermediate nodes exist in the intersection between P-space and Q-space and in the example shown it will be seen that there is one such node, node X designated 22. As a result, in the event of the failure of the link 16 packets of data can be sent from node A via a link designated 24 (which may of course be a succession of links and nodes) as far as the intermediate node X and then via a further link designated generally 26 to the target node B, which again may be a series of links and nodes. The links 24 and 26 can be viewed together as a "virtual" link forming a repair path in the event that link 16 fails or an alternative route is otherwise required.

The labels "P-space" and "Q-space" are arbitrary and used for convenience, and other embodiments may use any other label for the respective sets of nodes.

Figure 1B:
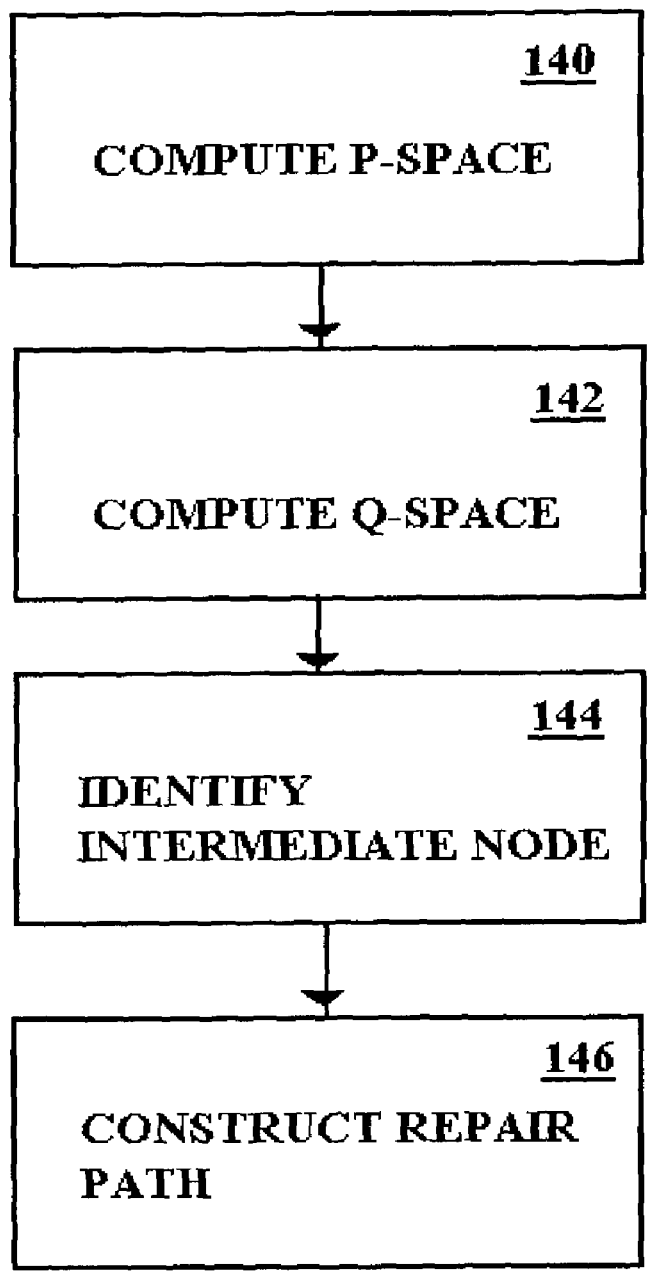
FIG. 1b is a flow diagram illustrating a high level view of a method for constructing a backup route.

FIG. 1b is a flow diagram illustrating a high level view of a method of constructing a backup route. In block 140 a P space is computed. In block 142 a Q space is computed. In block 144 an intermediate node in the intersection between P space and Q space is identified and in block 146 a repair path is constructed. As a result the path A×B shown in FIG. 1a, for example, can be constructed.

Because the P space and the Q space are derived based on the inherent routing protocol, no additional routing protocol is required on implementation of the method. In one embodiment, routing in the network 10 is governed by a link state protocol, the nature of which is discussed generally below, but it can use any appropriate protocol which, like the link state protocol, ensures that all nodes have all relevant data in order to derive a set of reachable nodes for other nodes on the network. In the present embodiment, all nodes pre-compute backup routes for all adjacent components as a result of which, as soon as a node detects de-activation of an adjacent component or otherwise needs an alternative route, that route is immediately available. As a result packet loss is minimized. Because the link state protocol is effectively undisturbed according to this method the fact that a repair path has been used is transparent to the remainder of the network. In the example discussed, backup routes are computed around an adjacent node, for example by constructing a Q-space for each neighbor node (as target node) of the adjacent node in block 142.

Where appropriate the method avoids packets being sent to the intermediate node X looping back to A along virtual link 24 by tunneling the packet to node X. In that case the intermediate node X comprises the tunnel end point.

In a further optimization the P-space 18 is extended in block 140 to include additional nodes within one hop of the nodes in the P-space. In that case the packet can be tunneled to the adjacent node in normal P-space with the instruction that the packet should be forwarded to the additional node, for example using "directed forwarding"In a further optimization the P-space is extended in block 140 by including in it all nodes reachable by neighbors of A without traversing the link 16. The method in this embodiment and its optimizations are discussed in more detail below.

3.0 Method of Constructing a Backup Route

The method described herein can be implemented according to any appropriate routing protocol whereby a node in a network has sufficient information to predict the forwarding behavior of other nodes in a stable network. Generally, link state protocols such as Intermediate System to Intermediate System (IS-IS) or Open Shortest Path First (OSPF) are appropriate protocols. Link state protocols of this type will be well understood by the skilled reader and are not described in detail here, but a brief summary is provided to highlight the aspects relevant to the method described herein.

The link state protocol relies on a routing algorithm resident at each node. Each node on the network advertises, throughout the network, links to neighboring nodes and provides a cost associated with each link which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB) which is a map of the entire network topology and from that constructs generally a single optimum route to each available node based on an appropriate algorithm such as, for example a shortest path first (SPF) algorithm. As a result a "spanning tree" is constructed, rooted at the node and showing an optimum path including intermediate nodes to each available destination node. Because each node has a common LSDB (other than when advertised changes are propagating around the network) any node is able to compute the spanning tree rooted at any other node as well as the "reverse spanning tree" sometimes termed a "sink tree" showing the optimum route for each node from which the node is reachable.

As a result when a packet for a destination node arrives at a node (which we term here the "first node"), the first node identifies the optimum route to that destination and forwards the packet to the next node along that route. The next node repeats this step and so forth.

It will be noted, therefore, that each node decides, irrespective of the node from which it received a packet, the next node to which the packet should be forwarded. In some instances this can give rise to a "loop". In particular this can occur when the databases (and corresponding forwarding information) are temporarily de-synchronized during a routing transition, that is, where because of a change on the network, a new LSP is propagated. As an example, if node A sends a packet to node Z via node B, comprising the optimum route according to its SPF, a situation can arise where node B, according to its SPF determines that the best route to node Z is via node A and sends the packet back. This can continue indefinitely although usually the packet will have a maximum hop count after which it will be discarded. Such a loop can be a direct loop between two nodes or an indirect loop around a circuit of nodes.

In some circumstances it is desirable to have more control over the route that a packet takes in which case "tunneling" can be used. According to this scheme if a node A receives a packet destined for node Z and for some reason it is desired that the packet should travel via node Y, under normal circumstances node A would have no control over this (unless Y was an adjacent node), as the route is dependent on the SPF at node A and any intermediate nodes as well. However node A can "tunnel" the packet to node Y by encapsulating the received packet within a packet having destination node Y and sending it to node Y which acts as the tunnel end point. When the packet is received at node Y it is decapsulated and Y then forwards the original packet to node Z according to its standard SPF. An alternative is to use IP source routing in which case the packet is converted to a loose source route packet replacing destination with next-hop, and then specifying the intermediate nodes and real destination. The route can be further controlled, under appropriate protocols, by multiple tunneling whereby a packet destined for a first node is encapsulated in a packet destined for a second node which in turn is encapsulated in a packet for a third node and so forth. However, this is a less attractive option as the maximum payload decreases with each encapsulation and multiple encapsulation is less easily built in the forwarding hardware at high speed. A further alternative is directed forwarding whereby the encapsulating packet includes a specific instruction as to which neighboring node of the end point the encapsulated packet should be sent, which comprises the "release point"

The manner in which a backup route is constructed in a link state protocol system can now be understood with regard to the following examples.

Figure 2A:
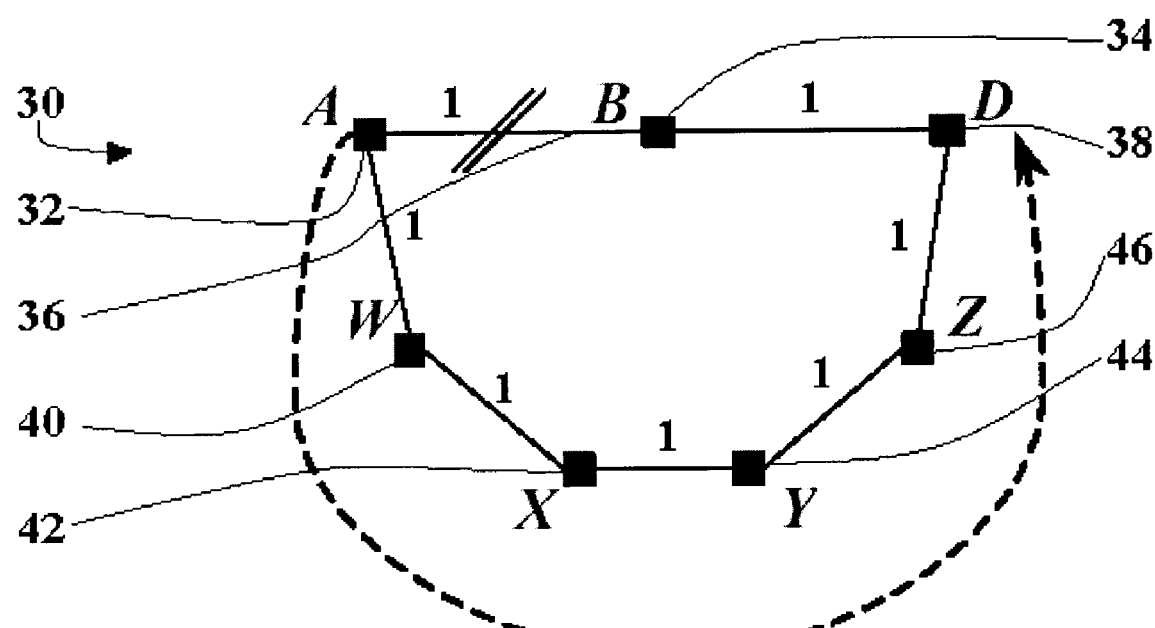
FIG. 2a is a network diagram illustrating considerations relevant to constructing a backup route.

Referring firstly to FIG. 2a which shows a network diagram illustrating considerations relevant to constructing a backup route a network is designated generally 30 and includes a repairing node A, 32 an adjacent node B, 34 and a link 36 between them. Node B has one further neighbor node D 38. An alternative route from node A to node D is via nodes W, X, Y, Z designated by reference numerals 40, 42, 44, 46 respectively. The link cost associated to each link is a cost 1.

It will be seen that if the link 36 or node B fails then node A must send packets to node D via nodes W, X, Y, Z. However if the packet is sent under normal circumstances to node W then node W will, not knowing that the link 36 has failed, compute that the lowest cost route to node D is back via node A (three intermediate links hence a cost 3 as against a cost of 4 via X, Y, Z, D). However if node A is able to "force" the packet as far as node X then node X will see the repair path as the cheaper route as opposed to sending back via A. As a result it is necessary to tunnel the packet from node A to node X. In fact either of the nodes Y or Z would also form appropriate end points. However it would not be appropriate to tunnel the packet directly from node A to node D. This is because when the packet was intercepted at node W it would identify the cheaper route to node D as in fact going once again via nodes A and B.

Figure 2B:
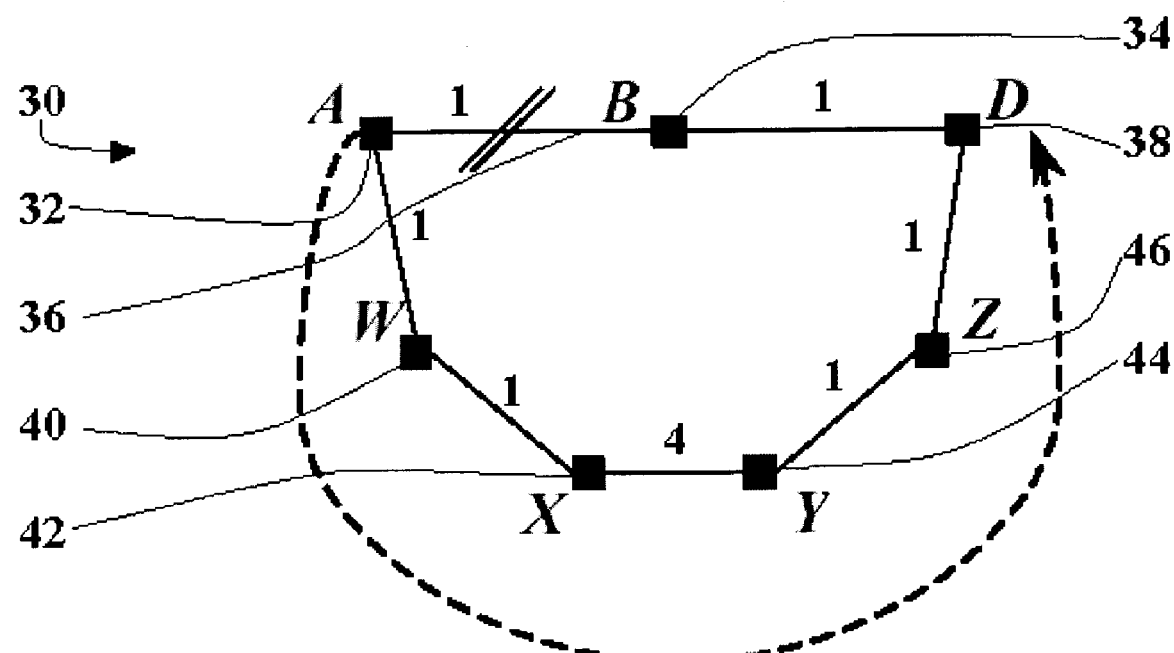
FIG. 2b is a variant network diagram to that of FIG. 2a illustrates further considerations relevant to constructing a backup route.

The problem becomes more complex in the situation shown in FIG. 2b which is a variant network diagram to that of FIG. 2a in which the cost of link X, Y is increased to 4. In this case there is no viable end point as can be seen from a consideration of the costs at each node. To overcome this, however, directed forwarding can be employed, selecting node X as the tunnel endpoint and then forwarding the packet to node Y as release point from which node D can be reached using normal forwarding. Node W represents a special case. If node W receives a packet with destination as node Y (for example as a tunnel end point) then the cost of taking either route X, Y or route A, B, D, Z, Y is equal, termed an "equal cost path split". As a result there is a risk that some packets may flow back towards the failed link and it cannot be considered an appropriate end point.

The method described in overview above provides efficient determination of the repair path required and automatically determines any endpoint or release point required as will be seen from the following example.

Figure 3:
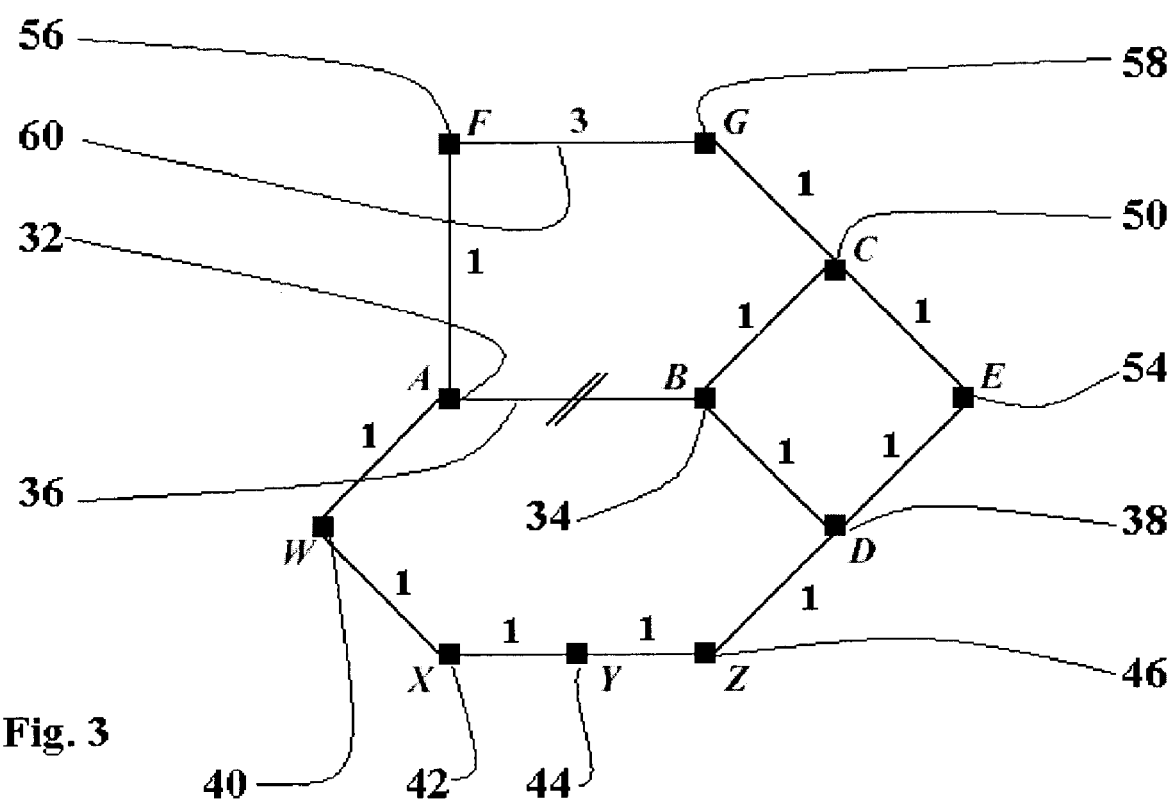
FIG. 3 is a network diagram comprising an extension of the network diagram of FIG. 2a illustrating one embodiment of a method for constructing a backup route.

FIG. 3 is a network diagram comprising an extension of the network diagram of FIG. 2a. The example topology of FIG. 3 includes the network shown in FIG. 2a in addition to further nodes C, E, F, G designated by reference numerals 50, 54, 56, 58 respectively forming additional circuits AFGCBA and BCED. All links have a cost of 1 excepting the link 60 between nodes F and G which has a cost of 3.

Figure 4:
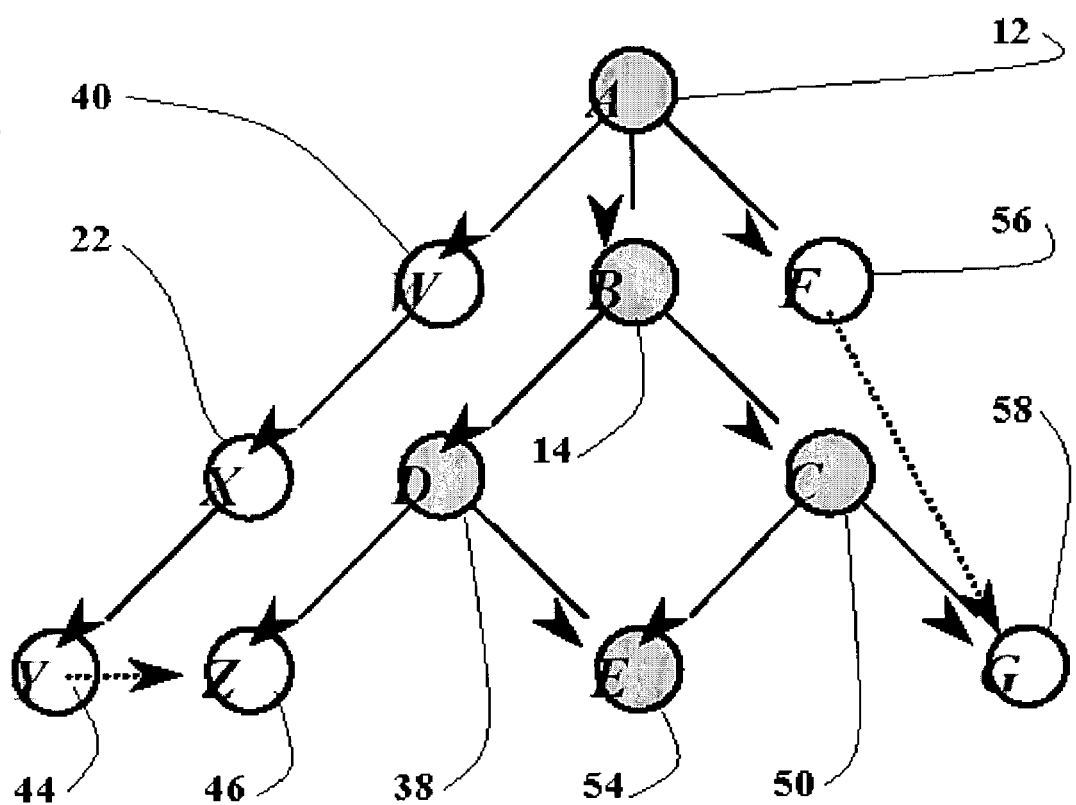
FIG. 4 is a spanning tree diagram for a node in the network shown in FIG. 3.

FIG. 4 is a spanning tree diagram for a node in the network shown in FIG. 3. In order to construct a backup route referring to FIG. 4 a spanning tree is computed rooted at router A. Those nodes reachable by the failed link 36 between nodes A and B are shown shaded gray including nodes that, because of an equal cost path split, could be reached by traversing the failed link 36. The shaded nodes are easily identified by running an SPF algorithm and setting a flag in the data structure when the failed component is explored and propagating that flag to all nodes reached over that component. In the present example in order to accommodate directed forwarding, the spanning tree, representing P-space 18 in FIG. 1, is extended to include as reachable nodes any nodes that are 1 hop away from a node already in the set, as a result of which node G and node Z are included in P-space.

It is now necessary to compute the Q-space 20. This computation is dependent on whether a potential node failure or a potential link failure is being considered. If it is a potential link failure then it is enough to ensure that a repair path is constructed around the link to the node the other side of it (node B as target node) after which traffic could be expected to be forwarded normally. However if node B failed then clearly this approach would not work. In that case it would be necessary to construct a repair path to each neighbor of the failed node (other than the node A itself of course) on the basis that the failed node would have forwarded traffic to its neighboring nodes in any event, and the neighboring nodes would then normally forward packets irrespective of how the packet reached them. It will be seen the worst case scenario is node failure rather than link failure and so this scenario is addressed here.

Figure 5:
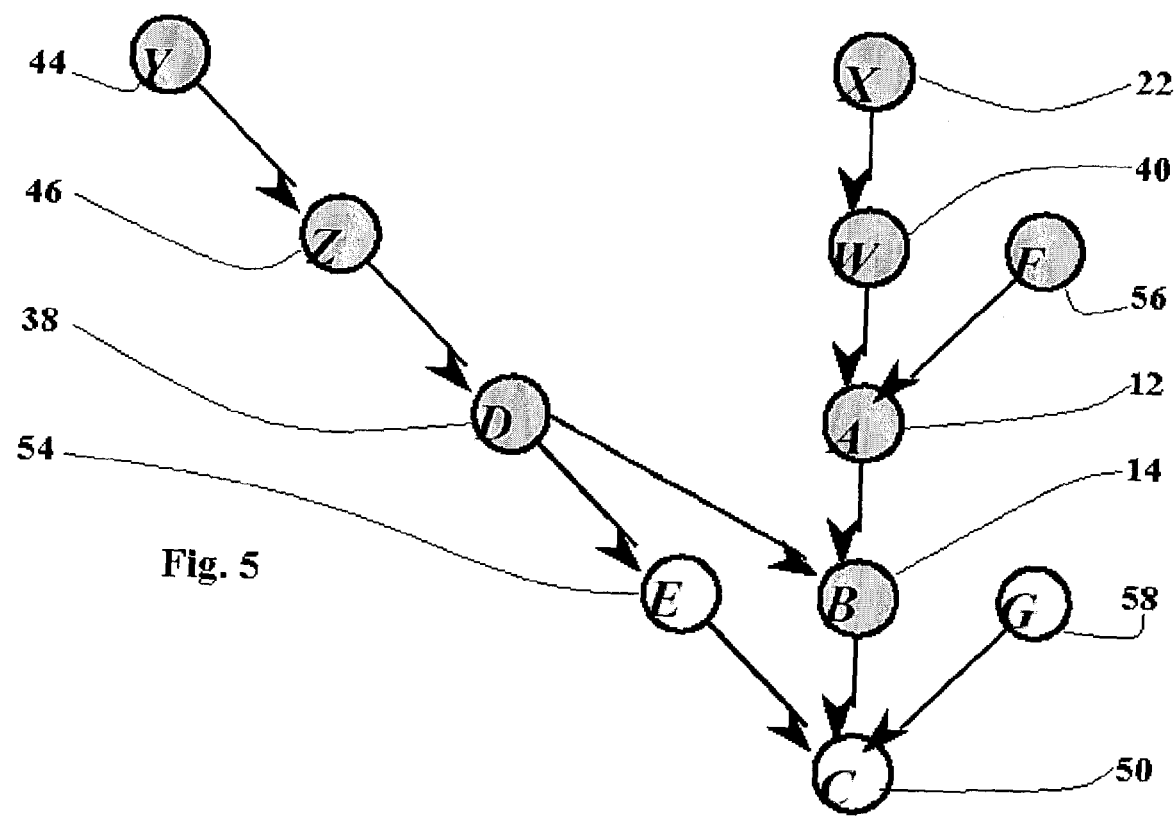
FIG. 5 is a reverse spanning tree diagram for a node in the network diagram of FIG. 3.
Figure 6:
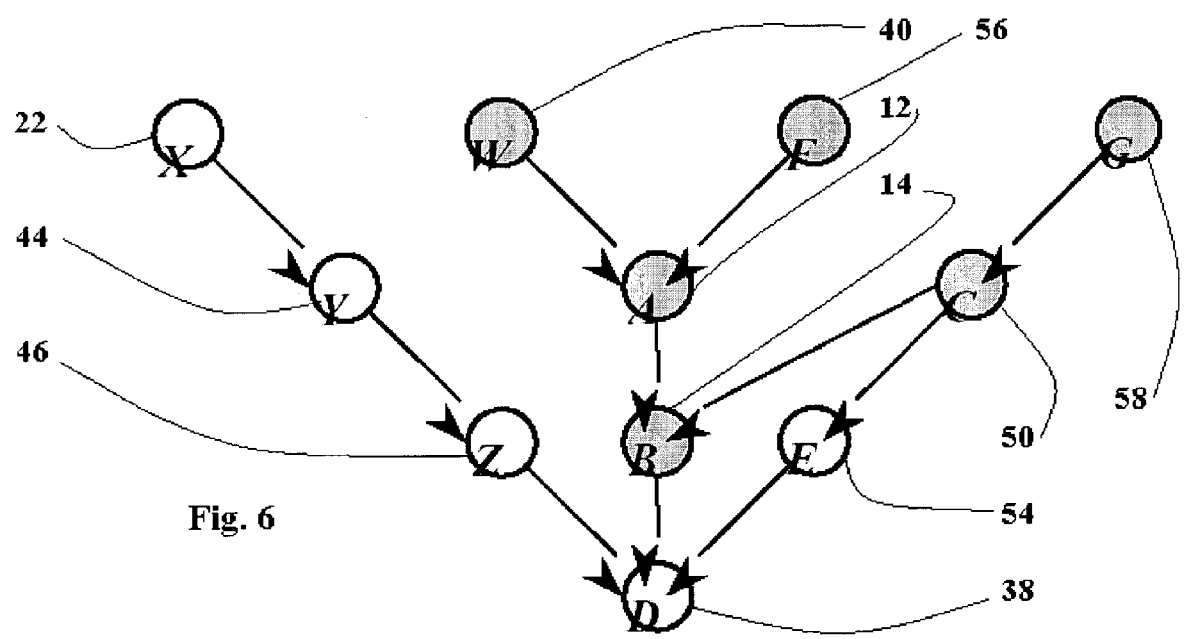
FIG. 6 is a reverse spanning tree diagram for another node in the network diagram of FIG. 3.

FIG. 5 and FIG. 6 are reverse spanning tree diagrams computed for the two neighbors to node B, nodes C and D respectively. In each case those nodes reachable only via the failed link (or on an equal cost path split) are shaded gray such that the "Q-space" comprises the unshaded nodes.

The first set of nodes reachable from node A (P-space) as shown in FIG. 4 comprises the set {FGWXYZ}. The Q-space from node C is {CEG} as can be seen in FIG. 5 and the Q-space for node D is {DEXYZ} as can be seen from FIG. 6. It will be appreciated that instead of extending the P-space to include additional nodes 1 hop away, Q-space can be extended instead in conjunction with directed forwarding. In addition it would be possible to run the SPF algorithm to obtain P and Q-space in any order.

As a result the respective release points from A to each of B's neighbor nodes can be obtained from the intersection of the respective P-space and Q-space sets as follows:
Release points from A to D: {XYZ} where X and Y are coincident tunnel endpoints and release points whereas Z must be reached by directed forwarding from the tunnel endpoint Y.
Release points from A to C: {G} where G is reached via directed forwarding from a tunnel end point F.

FIG. 7 is a flow diagram illustrating in more detail the method for constructing a backup route. In block 160 the spanning tree at the repairing node is computed excluding nodes reached by traversing the adjacent component. In the optimization discussed above the set of nodes obtained is extended by one hop in block 162 and an extended P space is constructed in block 164. The backup route constructed is then dependent upon whether node failure or link failure is addressed as represented by option block 166. If node failure is addressed then at block 168 the reverse spanning tree is computed for each neighbor of the failed node excluding nodes from which the neighbor is reachable via the repairing node and adjacent link. In block 170 the Q space is constructed. If at block 166, link failure is addressed then at block 172 the reverse spanning tree is computed for the failed adjacent node excluding nodes from which the adjacent node is reachable via the repairing node and adjacent link. In block 174, once again, a Q space is constructed.

Whichever failure type is addressed at block 166, at block 176 the intermediate node is identified. In block 178 it is then assessed whether the intermediate node is in the extended P space. If it is then at block 180 the repair path is constructed using tunneling and directed forwarding to the intermediate node. If the intermediate node is not in extended P-space then the repair path is constructed at block 182 using tunneling to the intermediate node as discussed above.

In block 164 the P-space for node A can be extended very simply by calculating the P-space for the neighbors to node A, namely nodes F and W which again can be calculated at node A from its LSDB. Because A will inevitably forward packets to one of these neighbors in the event that link 36 or node B fails, the set of reachable nodes and hence potentially, release points can be simply extended in this manner. It can be shown that the P-space can be derived individually for each neighboring node or by running an SPF algorithm rooted at A but decreasing the cost of nodes reachable over the neighboring node by an amount comprising the cost of the direct link between the nodes less the sum of the shortest cost link in each direction (bearing in mind that the direct link may not be the lowest cost link, and that there may be asymmetry). As a result individual SPFs rooted at each node do not need to be run.

As indicated, the preceding discussion is based on a worst case scenario that a node fails but it will be appreciated that it is possible to apply the method to an environment where link-failure is compensated in block 166 and subsequent blocks 172 and 174. In that case, referring once again to FIG. 3 the adjacent component that fails is link 36 and it is assumed that node B, 34 has not failed or otherwise been de-activated. For such a repair mechanism to operate it is necessary to detect that the neighboring node is still operational. However if this mechanism is adopted, then it is simply necessary to calculate a repair path from repairing node A with target node B rather than from node A with the neighbors of node B as target nodes. This can be adopted for each link neighboring node A.

A link failure repair strategy can be adopted where it is established that, using a node failure repair strategy, it would not have been possible to identify a repair path to certain target nodes. This is effective when the presumed failed node constitutes a single point of failure such that the target nodes are unreachable other than via the presumed failed node. In that case by forwarding packets to the "failed" node this is their only prospect of arriving at the "unreachable" nodes.

However this approach can give rise to problems in some instances and a further optimisation is discussed here to mitigate such problems. In particular problems can arise if a link repair strategy is adopted but certain target nodes are unreachable for other reason than a single point of failure. This alternative reason may be that severe link cost asymmetries prevent a repair path from being available adopting the method discussed above or that there is interference caused by a repairing node including another neighbour of the failed node in its repair path in some circumstances.

Accordingly, if it is established that a repair path is not available for some neighbours of the failed node (referred to as the set of unavailable nodes {X}) a check is performed to establish why. An SPF is run rooted at A and with B removed. If all members of {X} are unreachable then B is a single point of failure and a link repair strategy can be run for packets to those nodes, as the worst case scenario is that the node really has failed in which case the members of {X} remain unreachable even after convergence.

However if any member of {X} is reachable then a repair path must be unavailable because of asymmetry or interference. In that case if a link failure repair strategy is adopted and the node has in fact failed then the strategy is worse as traffic to some otherwise reachable destinations would be forwarded along a link repair path that may not work. Here, therefore all repairs for the component are abandoned.

Accordingly the repairing node can determine whether a link failure repair strategy should be adopted.

Although it would be possible to calculate repair paths on-the-fly, in the embodiment discussed here repair paths are pre-computed in order that they can be implemented promptly upon failure detection. As a result each node contains the pre-computed repair paths for the failure of each adjacent component—in the example discussed, for each adjacent node (but not destination nodes beyond that as it is enough to route the packet round the failure after which normal forwarding will take over). When the failure of an adjacent component is detected by the node the appropriate repair path or paths are put in place. Where necessary an incoming packet is then directed along the appropriate route. Each of these steps will now be discussed in more detail.

As discussed above, repair paths are identified by examining the intersection of a P-space and a Q-space at block 178 in FIG. 7 and using tunneling/directed forwarding as appropriate. However more than one repair path may be available, and in some cases a repair path may not in fact be needed. As represented in block 184, optionally, the first computation step, therefore, is to limit the construction of repair paths to instances where this is necessary. As a result, any neighbor nodes to the adjacent node that are already reached by a shortest path route not traversing the adjacent node do not need to have a repair path calculated for them. Put conversely, it is only necessary to construct repair paths for neighbors which, according to the repairing node's spanning tree, are reached via the path for which protection is to be performed. In addition, if the destination node lies on an equal cost path split then the other limb can be adopted as the repair path. As a result the computational burden on the repairing node is reduced.

For each neighbor that still requires a repair path, the possible paths are derived as discussed above. If a complete set of repair paths is not possible around a given adjacent component then none are constructed as, if an incomplete set of repair paths were constructed, packets could be lost. In cases where the tunnel endpoint is a neighbor of the repairing node then normal forwarding to the endpoint can be adopted unless directed forwarding is required from the tunnel endpoint to the release point (in which case the tunneling mechanism is required).

If multiple repair paths are available (i.e. more than one pair of tunnel endpoint and release point is identified in the intersection of P-space and Q-space) then the optimum repair path is selected on a least cost basis, based on the cost to the release point (or tunnel endpoint if these are coincident). In the present example, the cost is the cost of the path that packets will actually traverse via the release point including the cost of a new link over which directed forwarding is performed as this represents a lower computational burden and may be more representative than, say, the cost to the target via the repair path. However the selection process can be optimized by stopping running the Q-space reverse SPF as soon as a node in the (extended) P-space is identified. Although this may not find the shortest route this is outweighed by the reduced computational burden. A yet further optimization is to ensure that no downstream path (i.e. intermediate nodes comprising a neighbor of the repairing node) is excluded. This is achieved by stopping running the reverse SPF algorithm at the earlier of:

having reached all neighbors of the repairing node via the failed link (in which case there can be no downstream path as these neighbors will hence not occur in Q-space) and having identified another release point; and having reached a neighbor of the repairing node not via the failed link. Of course any appropriate manner of identifying the optimum repair path can be adopted.

Once the least cost repair path is assigned, there may still be multiple repair paths, one for each neighbor of the adjacent component which is a repair path target. To identify which repair path should be used it is necessary to assess the final destination of an incoming packet to the repairing node. This is achieved by recording which neighbor node of the adjacent component would be used to reach each destination via the adjacent component in normal operation and assigning the traffic to the repair path generated with the appropriate neighbor as target.

Figure 8:
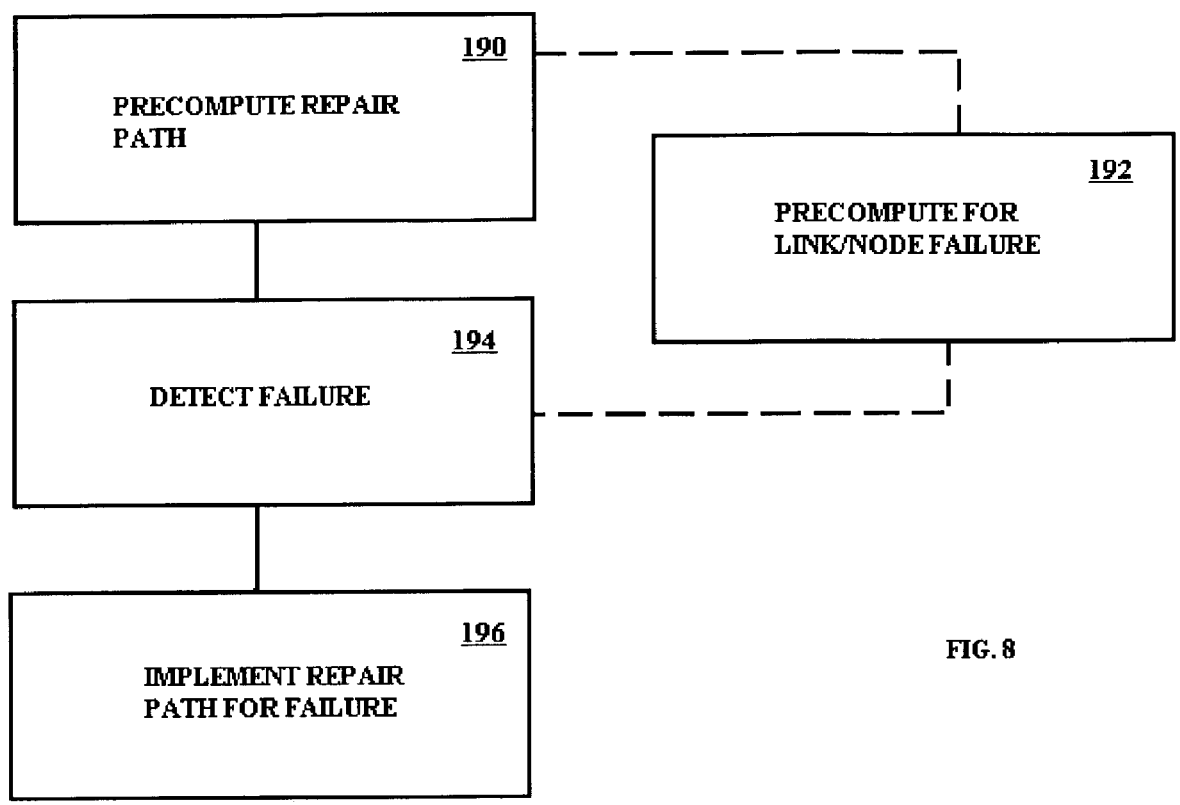
FIG. 8 is a flow diagram illustrating implementation of a backup route.

It will be seen that actual implementation of the backup path method is simple and will be apparent to the skilled person. FIG. 8 is a flow diagram illustrating implementation of the method. In brief summary, in block 190 each node precomputes repair paths based on the considerations set out above. This is carried out each time a new LSP is received from some node in the network. In some instances a succession of LSPs may be issued and so in an optimization a node operates a "hold-down" whereby it only pre-computes repair paths once a pre-determined time—say several seconds has elapsed since receipt of the last LSP, or the LSPs have been received successively for a long period, say a minute. This is acceptable as the repair path will only be used in the event of a subsequent failure. As an alternative, if a node recognises that it is issuing one in a series of LSPs a tag can be added to the LSP using any appropriate protocol to indicate that the LSP is one of a series. On receiving such an LSP, the receiving node can defer recomputing repair paths until the series finishes, once again reducing the computational burden.

In an optimization, in optional block 192 repair paths are pre-calculated for presumed node failures as well as, if it can be identified that the failed node would be a single point of failure for any neighbor node, and no neighbor nodes would be unreachable for other reasons, link failure repair paths to the "failed node" as discussed above for those nodes. If it is established that certain unreachable nodes are unavailable other than because the failed node is a single point of failure then a non-repair path strategy is adopted for the node rather than a partial repair strategy as discussed above.

In block 194, when a component fails, an adjacent node (the repairing node) detects this. The manner in which failure is detected will be well known to the skilled person and will be dependent upon the specific nature of the source node and the adjacent component. In block 196, as soon as failure is detected the pre-computed repair path is adopted for traffic which would otherwise traverse the adjacent component. Dependent upon the final destination of incoming traffic, the appropriate repair path is then selected for that traffic. The method can equally be applied in case of planned downtime of a component in which case appropriate notification to the node ensures no packet loss, or where appropriate protocols are in place, in cases where traffic is redirected to other paths because of adjacent component overload.

The mechanism by which the repair paths are stored and implemented will be well known to the skilled person such that a detailed description is not required here. Repair paths are calculated in the existing routing code as a natural extension of the computation as carried out in any event. Various databases and tables storing the routing and forwarding information can be updated in any appropriate manner, for example varying appropriate data fields or pointers in database entries or by storing repair paths along with normal entries. The above discussion assumes that each node is capable of acting as a tunnel termination point and performing directed forwarding or an equivalent mechanism which may not be the case for all routers. To the extent that a node is available to carry out the appropriate functions this can be advertised by modifying the appropriate fields in the advertisement and where this is not present, it can be inferred that the router sending an advertisement does not support tunnel termination. This can be a further factor in selecting a desired intermediate node.

4.0 Implementation Mechanisms—Hardware Overview

Figure 9:
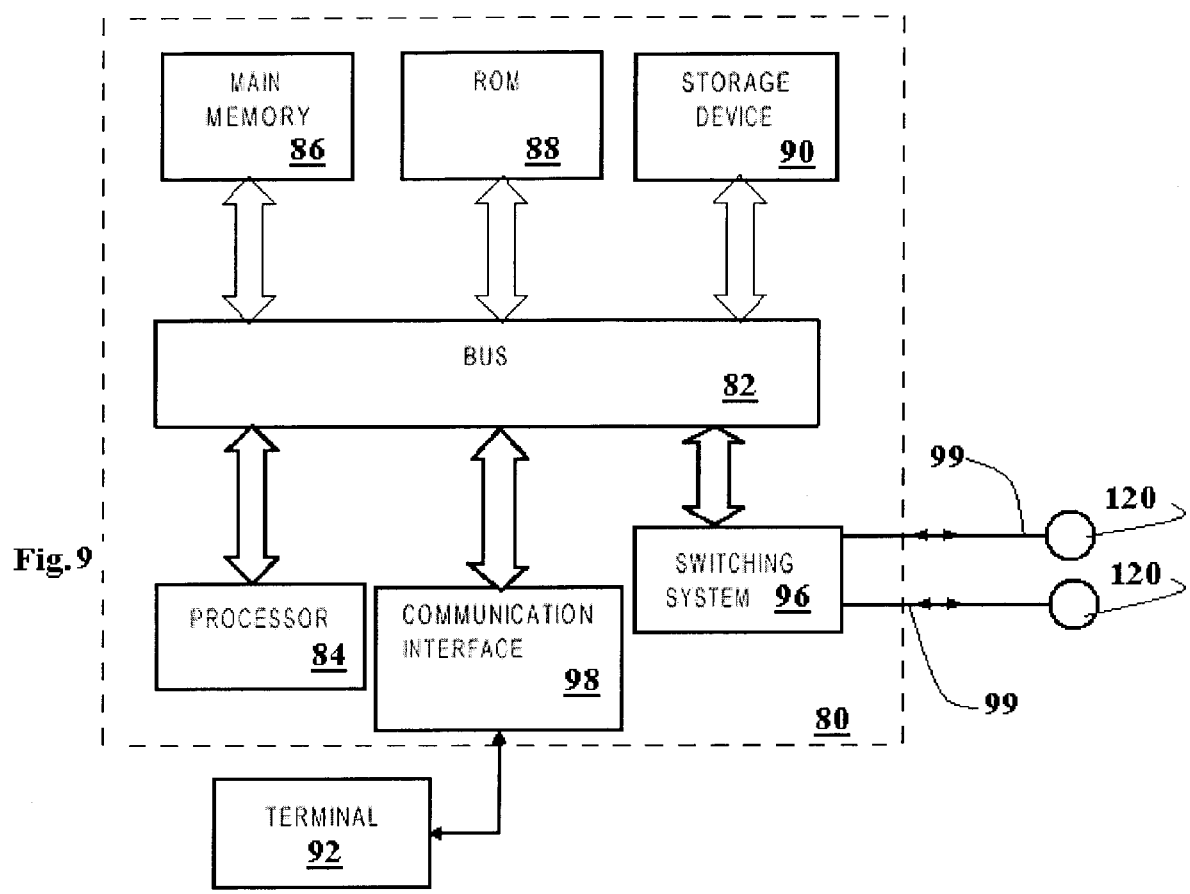
FIG. 9 is a block diagram that illustrates a computer system upon which an embodiment of the method may be implemented.

FIG. 9 is a block diagram that illustrates a computer system 80 upon which an embodiment of the invention may be implemented. The preferred embodiment is implemented using one or more computer programs running on a network element such as a router device. Thus, in this embodiment, the computer system 80 is a router.

Computer system 80 includes a bus 82 or other communication mechanism for communicating information, and a processor 84 coupled with bus 82 for processing information. Computer system 80 also includes a main memory 86, such as a random access memory (RAM), flash memory, or other dynamic storage device, coupled to bus 82 for storing information and instructions to be executed by processor 84. Main memory 86 also may be used for storing temporary variables or other intermediate information during execution of instructions to be executed by processor 84. Computer system 80 further includes a read only memory (ROM) 88 or other static storage device coupled to bus 82 for storing static information and instructions for processor 84. A storage device 90, such as a magnetic disk, flash memory or optical disk, is provided and coupled to bus 82 for storing information and instructions.

A communication interface 98 may be coupled to bus 82 for communicating information and command selections to processor 84. Interface 98 is a conventional serial interface such as an RS-232 or RS-422 interface. An external terminal 92 or other computer system connects to the computer system 80 and provides commands to it using the interface 98. Firmware or software running in the computer system 80 provides a terminal interface or character-based command interface so that external commands can be given to the computer system.

A switching system 96 is coupled to bus 82 and has an input interface and a respective output interface (commonly designated 99) to external network elements. The external network elements may include a plurality of additional routers 120 or a local network coupled to one or more hosts or routers, or a global network such as the Internet having one or more servers. The switching system 96 switches information traffic arriving on the input interface to output interface 99 according to pre-determined protocols and conventions that are well known. For example, switching system 96, in cooperation with processor 84, can determine a destination of a packet of data arriving on the input interface and send it to the correct destination using the output interface. The destinations may include a host, server, other end stations, or other routing and switching devices in a local network or Internet.

The computer system 80 implements as a router acting as a repairing node the above described method of constructing a backup route where a link 99 or the router 120 connected to it comprises the adjacent component. According to one embodiment of the invention, the implementation is provided by computer system 80 in response to processor 84 executing one or more sequences of one or more instructions contained in main memory 86. Such instructions may be read into main memory 86 from another computer-readable medium, such as storage device 90. Execution of the sequences of instructions contained in main memory 86 causes processor 84 to perform the process steps described herein. One or more processors in a multi-processing arrangement may also be employed to execute the sequences of instructions contained in main memory 86. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 84 for execution. Such a medium may take many forms, including but not limited to, non-volatile media, volatile media, and transmission media. Non-volatile media includes, for example, optical or magnetic disks, such as storage device 90. Volatile media includes dynamic memory, such as main memory 86. Transmission media includes coaxial cables, copper wire and fiber optics, including the wires that comprise bus 82. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 84 for execution. For example, the instructions may initially be carried on a magnetic disk of a remote computer. The remote computer can load the instructions into its dynamic memory and send the instructions over a telephone line using a modem. A modem local to computer system 80 can receive the data on the telephone line and use an infrared transmitter to convert the data to an infrared signal. An infrared detector coupled to bus 82 can receive the data carried in the infrared signal and place the data on bus 82. Bus 82 carries the data to main memory 86, from which processor 84 retrieves and executes the instructions. The instructions received by main memory 86 may optionally be stored on storage device 90 either before or after execution by processor 84.

Interface 99 also provides a two-way data communication coupling to a network link that is connected to a local network. For example, the interface 99 may be an integrated services digital network (ISDN) card or a modem to provide a data communication connection to a corresponding type of telephone line. As another example, the interface 99 may be a local area network (LAN) card to provide a data communication connection to a compatible LAN. Wireless links may also be implemented. In any such implementation, the interface 99 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet" The local network and the Internet both use electrical, electromagnetic or optical signals that carry digital data streams. The signals through the various networks and the signals on the network link and through the interface 99, which carry the digital data to and from computer system 80, are exemplary forms of carrier waves transporting the information.

Computer system 80 can send messages and receive data, including program code, through the network(s), network link and interface 99. In the Internet example, a server might transmit a requested code for an application program through the Internet, ISP, local network and communication interface 98. In accordance with the invention, one such downloaded application provides for the method as described herein.

The received code may be executed by processor 94 as it is received, and/or stored in storage device 90, or other non-volatile storage for later execution. In this manner, computer system 80 may obtain application code in the form of a carrier wave.

5.0 Extensions and Alternatives

Although the computation of the repair path is discussed as taking place at the repair node it can equally occur at a remote node which then downloads repair paths to all repairing nodes. Although tunneling and directed forwarding are discussed as technique for forwarding packets to the intermediate node, any appropriate packet routing mechanism can be adopted as long as it is supported by the relevant nodes, for example loose or strict source routing. The method steps set out can be carried out in any appropriate order, for example P and Q space can be constructed in any order or indeed simulataneously and aspects from the examples and embodiments described juxtaposed or interchanged as appropriate.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of constructing a backup route for a primary route in a data communications network, said data communications network having as components nodes and links defining a network topology, said primary route including a first node, an adjacent component that is adjacent to the first node, and a second node that neighbors the adjacent component, the method comprising:
   (a) deriving from the topology a first set of nodes reachable from the first node without traversing the adjacent component, wherein the first set of nodes is different from the primary route;
   (b) deriving from the topology a second set of nodes from which the second node is reachable without traversing the adjacent component, wherein the second set of nodes is different from the primary route;
   (c) determining an intersection of the first set of nodes and the second set of nodes, the intersection comprising an intermediate node, wherein the intermediate node is neither the adjacent component nor in the primary route; and
   (d) constructing the backup route via the intermediate node;
   wherein the backup route includes the first node and the second node, but does not traverse the adjacent component;
   wherein the backup route is different from the first set of nodes and the second set of nodes;
   wherein the method is performed by one or more computing devices.

2. A method as claimed in claim 1, further comprising the step of constructing at least one backup route around each component adjacent to the first node prior to any of the components adjacent to the first node failing.

3. A method as claimed in claim 1, further comprising the step of constructing a plurality of backup routes, each of said plurality of backup routes including a different neighbor node of the adjacent component that would be normally reached via the adjacent component.

4. A method as claimed in claim 1, further comprising carrying out the step of applying the backup route around the adjacent component in the event of at least one of adjacent component failure, adjacent component de-activation or adjacent component overload.

5. A method as claimed in claim 4 further comprising causing data to follow the backup route instead of the primary route by tunneling the data from the first node to an endpoint comprising the intermediate node.

6. A method as claimed in claim 5, in which the reachable nodes include all nodes that are reachable via a routing mechanism and additional nodes that are reachable therefrom via a forwarding mechanism without traversing the adjacent component.

7. A method as claimed in claim 6, in which the tunneling mechanism comprises one of directed forwarding or multiple tunneling, or loose or strict source routing.

8. A method as claimed in claim 7, in which the data is tunneled unless the intermediate node is a neighbor of the first node and the predetermined forwarding mechanism is not required.

9. A method as claimed in claim 1, in which the reachable nodes include nodes reachable from a neighbor node of the repairing node without traversing the adjacent component.

10. A method as claimed in claim 1, further comprising the step of deriving the first and second sets of nodes using a link state routing protocol.

11. A method as claimed in claim 10, in which the first and second sets of nodes comprise forward and reverse spanning trees respectively.

12. A method as claimed in claim 1 wherein the steps of deriving the first set of nodes and the second set of nodes are performed by iteratively adding nodes to the first set of nodes and the second set of nodes until the intermediate node is identified.

13. A method as claimed in claim 1 where the adjacent component comprises one of an adjacent node and an adjacent link between the first node and the adjacent node, and further comprising the steps of:
   identifying as an unavailable node any neighbor node of the adjacent node for which a backup route is unavailable,
   treating the adjacent node as the adjacent component, deriving from the topology a third set of nodes reachable from the repair node with the adjacent node removed, and
   if no unavailable node is included in the third set, constructing a backup route treating the adjacent link as the adjacent component.

14. A computer readable storage medium comprising one or more sequences of instructions for constructing a backup route for a primary route in a data communications network, said data communications network having as components nodes and links defining a network topology, said primary route including a first node, an adjacent component that is adjacent to the first node, and a second node that neighbors the adjacent component, which instructions, when executed by one or more processors, cause the one or more processors to perform:

(a) deriving from the topology a first set of nodes reachable from the first node without traversing the adjacent component, wherein the first set of nodes is different from the primary route;
(b) deriving from the topology a second set of nodes from which the second node is reachable without traversing the adjacent component, wherein the second set of nodes is different from the primary route;
(c) determining an intersection of the first set of nodes and the second set of nodes, the intersection comprising an intermediate node, wherein the intermediate node is neither the adjacent component nor in the primary route; and
(d) constructing the backup route via the intermediate node;
wherein the backup route includes the first node and the second node, but does not traverse the adjacent component;
wherein the backup route is different from the first set of nodes and the second set of nodes.

15. An apparatus for constructing a backup route for a primary route in a data communications network, said data communications network having as components nodes and links defining a network topology, said primary route including a first node, an adjacent component that is adjacent to the first node, and a second node that neighbors the adjacent component, the apparatus comprising:
(a) means for deriving from the topology a first set of nodes reachable from the first node without traversing the adjacent component, wherein the first set of nodes is different from the primary route;
(b) means, deriving from the topology a second set of nodes from which the second node is reachable without traversing the adjacent component, wherein the second set of nodes is different from the primary route;
(c) means for determining an intersection of the first set of nodes and the second set of nodes, the intersection comprising an intermediate node, wherein the intermediate node is neither the adjacent component nor in the primary route; and
(d) means for constructing the backup route via the intermediate node;
wherein the backup route includes the first node and the second node, but does not traverse the adjacent component;
wherein the backup route is different from the first set of nodes and the second set of nodes.

16. An apparatus as claimed in claim 15, further comprising means for constructing at least one backup route around each component adjacent to the first node prior to any of the components adjacent to the first node failing.

17. An apparatus as claimed in claim 15, further comprising means for constructing a plurality of backup routes, each of said plurality of backup routes including a different neighbor node of the adjacent component that would be normally reached via the adjacent component.

18. An apparatus as claimed in claim 15, further comprising means for carrying out the step of applying the backup route around the adjacent component in the event of at least one of adjacent component failure, adjacent component deactivation or adjacent component overload.

19. An apparatus as claimed in claim 18 further comprising means for causing data to follow the backup route instead of the primary route by tunneling the data from the first node to an endpoint comprising the intermediate node.

20. An apparatus as claimed in claim 19, in which the reachable nodes include all nodes reachable via a routing mechanism and additional nodes reachable therefrom via a forwarding mechanism without traversing the adjacent component.

21. An apparatus as claimed in claim 20, in which the tunneling mechanism comprises one of directed forwarding or multiple tunneling, or loose or strict source routing.

22. An apparatus as claimed in claim 21, further comprising means for tunneling the data unless the intermediate node is a neighbor of the first node and the forwarding mechanism is not required.

23. An apparatus as claimed in claim 15, in which the reachable nodes include nodes reachable from a neighbor node of the repairing node without traversing the adjacent component.

24. An apparatus as claimed in claim 15, further comprising means for deriving the first and second sets of nodes using a link state routing protocol.

25. An apparatus as claimed in claim 24, in which the first and second sets of nodes comprise forward and reverse spanning trees respectively.

26. An apparatus as claimed in claim 15 wherein the means for deriving the first set of nodes and the second set of nodes derive the first set of nodes and the second set of nodes by iteratively adding nodes to the first set of nodes and the second set of nodes until the intermediate node is identified.

27. An apparatus as claimed in claim 15 where the adjacent component comprises one of an adjacent node and an adjacent link between the first node and the adjacent node, further comprising means for identifying as an unavailable node any neighbor node of the adjacent node for which a backup route is unavailable, treating the adjacent node as the adjacent component, deriving from the topology a third set of nodes reachable from the repair node with the adjacent node removed, and if no unavailable node is included in the third set, constructing a backup route treating the adjacent link as the adjacent component.

28. An apparatus for constructing a backup route from a repairing node in a data communications network having as components nodes and links defining a network topology, around an adjacent component, the apparatus comprising:
a processor;
a network interface communicatively coupled to the processor and configured to communicate one or more packet flows among the processor and a network; and
a computer readable medium comprising one or more sequences of instructions for constructing a backup route for a primary route in a data communications network, said data communications network having as components nodes and links defining a network topology, said primary route including a first node, an adjacent component that is adjacent to the first node, and a second node that neighbors the adjacent component, which instructions, when executed by the processor, cause the processor to perform:
(a) deriving from the topology a first set of nodes reachable from the first node without traversing the adjacent component, wherein the first set of nodes is different from the primary route;
(b) deriving from the topology a second set of nodes from which the second node is reachable without traversing the adjacent component, wherein the second set of nodes is different from the primary route;
(c) determining an intersection of the first set of nodes and the second set of nodes, the intersection comprising an intermediate node, wherein the intermediate node is neither the adjacent component nor in the primary route; and (d) constructing the backup route via the intermediate node;

wherein the backup route includes the first node and the second node, but does not traverse the adjacent component;

wherein the backup route is different from the first set of nodes and the second set of nodes.

29. An apparatus as claimed in claim 28, further comprising sequences of instructions which when executed cause constructing a plurality of backup routes, each of said plurality of backup routes including a different neighbor node of the adjacent component that would be normally reached via the adjacent component.

30. An apparatus as claimed in claim 28, further comprising sequences of instructions which when executed cause applying the backup route around the adjacent component in the event of at least one of adjacent component failure, adjacent component de-activation or adjacent component overload.

31. An apparatus as claimed in claim 30 further comprising sequences of instructions which when executed cause data to follow the backup route instead of the primary route by tunneling the data from the first node to an endpoint comprising the intermediate node.

32. An apparatus as claimed in claim 31, in which the reachable nodes include all nodes that are reachable via a routing mechanism and additional nodes that are reachable therefrom via a forwarding mechanism without traversing the adjacent component.

33. An apparatus as claimed in claim 32, in which the tunneling mechanism comprises one of directed forwarding or multiple tunneling, or loose or strict source routing, and further comprising sequences of instructions which when executed cause tunneling data traffic unless the intermediate node is a neighbor of the first node and the predetermined forwarding mechanism is not required.

34. An apparatus as claimed in claim 28, in which the reachable nodes include nodes reachable from a neighbor node of the repairing node without traversing the adjacent component.

35. An apparatus as claimed in claim 28 wherein the steps of deriving the first set of nodes and the second set of nodes are performed by iteratively adding nodes to the first set of nodes and the second set of nodes until the intermediate node is identified.

36. An apparatus as claimed in claim 28 where the adjacent component comprises one of an adjacent node and an adjacent link between the first node and the adjacent node, and further comprising sequences of instructions which when executed cause:

identifying as an unavailable node any neighbor node of the adjacent node for which a backup route is unavailable, treating the adjacent node as the adjacent component, deriving from the topology a third set of nodes reachable from the repair node with the adjacent node removed, and if no unavailable node is included in the third set, constructing a backup route treating the adjacent link as the adjacent component.

* * * * *